United States Patent [19]
Gong

[11] Patent Number: 6,125,447
[45] Date of Patent: Sep. 26, 2000

[54] PROTECTION DOMAINS TO PROVIDE SECURITY IN A COMPUTER SYSTEM

[75] Inventor: Li Gong, Menlo Park, Calif.

[73] Assignee: Sun Microsystems, Inc., Mountain View, Calif.

[21] Appl. No.: 08/988,439

[22] Filed: Dec. 11, 1997

[51] Int. Cl.$^7$ ........................................... H04L 9/00
[52] U.S. Cl. .......................................... 713/201; 713/154
[58] Field of Search ........................... 713/200, 201–202, 713/151, 152, 153, 154–168, 169; 709/229, 303; 395/704; 714/38, 48; 707/103, 9, 10; 380/4

[56] References Cited

U.S. PATENT DOCUMENTS

| | | | |
|---|---|---|---|
| 5,311,591 | 5/1994 | Fischer | 380/4 |
| 5,720,033 | 2/1998 | Deo | 713/200 |
| 5,758,153 | 5/1998 | Atsatt et al. | 395/614 |
| 5,841,870 | 11/1998 | Fieres et al. | 380/25 |
| 5,845,129 | 12/1998 | Wendorf et al. | 395/726 |
| 5,892,904 | 4/1999 | Atkinson et al. | 713/201 |

FOREIGN PATENT DOCUMENTS

| | | | |
|---|---|---|---|
| 2259590A | 3/1993 | WIPO | G06F 9/44 |
| 2308688A | 7/1997 | WIPO | G06F 12/14 |

OTHER PUBLICATIONS

Gong Li, et al.: "Going Beyond the Sandbox: An Overview of the New Security Architecture in the Java™ Development Kit 1.2", Proceedings of the Usenix Symposium on Internet Technologies and Systems, Monterey, CA, USA, 8–11 Dec. 1997, ISBN 1–880446–91–S, 1997, Berkeley, CA, USA, Usenix Assoc., USA, pp. 103–112, XP002100907.

Wallach, D. S., et al.: "Extensible Security Architectures for Java", 16th ACM Symposium on Operating Systems Principles, Sain Malo, France, 5–8 Oct. 1997, ISSN 0163–5980, Operating Systems Review, Dec. 1997, ACM, USA, pp. 116–128, XP–002101681.

Dean, D., et al., "Java Security: From HotJava to Netscape and Beyond," Proceedings of the 1996 IEEE Symposium on Security and Privacy, Oakland, CA, May 6–8, 1996.

Hamilton, M.A., "Java and the Shift to Net–Centric Computing," Computer, vol. 29, No. 8, Aug., 1996.

*Primary Examiner*—Robert W. Beausoliel, Jr.
*Assistant Examiner*—Scott T. Baderman
*Attorney, Agent, or Firm*—McDermott, Will & Emery

[57] ABSTRACT

A method and apparatus are provided for maintaining and enforcing security rules using protection domains. As new code arrives at a computer, a determination is assigned to a protection domain based on the source from which the code is received. The protection domain establishes the permissions that apply to the code. In embodiments where the code to be executed by the computer belongs to object classes, an association is established between the protection domains and the classes of objects. When an object requests an action, a determination is made as to whether the action is permitted based on the class to which the object belongs and the association between classes and protection domains.

24 Claims, 6 Drawing Sheets

Policy File 244

| | |
|---|---|
| permission file://somesource | somekey write /tmp/* — 320-1 |
| permission file://othersource | otherkey write /tmp/* |
| | |
| permission http://www.source.com | lastkey write /tmp/* |

Instructions 320-1 to 320-P

Fig. 3

PROTECTION DOMAINS TO PROVIDE SECURITY IN A COMPUTER SYSTEM

RELATED APPLICATIONS

The present application is related to U.S. patent application Ser. No. 08/988,857, entitled "TYPED, PARAMETERIZED, AND EXTENSIBLE ACCESS CONTROL PERMISSIONS", filed by Li Gong, on the equal day herewith, now U.S. Pat. No. 6,047,377 the contents of which are incorporated herein by reference.

The present application is related to U.S. patent application Ser. No. 08/988,431, entitled "CONTROLLING ACCESS TO A RESOURCE", filed by Li Gong, on the equal day herewith, the contents of which are incorporated herein by reference.

The present application is related to U.S. patent application Ser. No. 08/988,660, entitled "SECURE CLASS RESOLUTION, LOADING, AND DEFINITION", filed by Li Gong, on the equal day herewith, now U.S. Pat. No. 6,044,467, the contents of which are incorporated herein by reference.

FIELD OF THE INVENTION

The present invention relates to security mechanisms in a computer system.

BACKGROUND OF THE INVENTION

As the use of computer systems grows, organizations are becoming increasingly reliant upon them. A malfunction in the computer system can severely hamper the operation of such organizations. Thus organizations that use computer systems are vulnerable to users who may intentionally or unintentionally cause the computer system to malfunction.

One way to compromise the security of a computer system is to cause the computer system to execute software that performs harmful actions on the computer system. There are various types of security measures that may be used to prevent a computer system from executing harmful software. One example is to check all software executed by the computer system with a "virus" checker. However, virus checkers only search for very specific software instructions. Many methods of using software to tamper with a computer's resources would not be detected by a virus checker.

Another very common measure used to prevent the execution of software that tampers with a computer's resources is the "trusted developers approach". According to the trusted developers approach, system administrators limit the software that a computer system can access to only software developed by trusted software developers. Such trusted developers may include, for example, well know vendors or in-house developers.

Fundamental to the trusted developers approach is the idea that computer programs are created by developers, and that some developers can be trusted to not have produced software that compromises security. Also fundamental to the trusted developers approach is the notion that a computer system will only execute programs that are stored at locations that are under control of the system administrators.

Recently developed methods of running applications involve the automatic and immediate execution of software code loaded from remote sources over a network. When the network includes remote sources that are outside the control of system administrators, the trusted developers approach does not work.

One attempt to adapt the trusted developers approach to systems that can execute code from remote sources is referred to as the sand box method. The sand box method allows all code to be executed, but places restrictions on remote code. Specifically, the sand box method permits all trusted code full access to computer system's resources and all remote code limited access to a computer system's resources. Trusted code is usually stored locally on the computer system under the direct control of the owners or administrators of the computer system, who are accountable for the security of the trusted code.

One drawback to the sandbox approach is that the approach is not very granular. The sandbox approach is not very granular because all remote code is restricted to the same limited set of resources. Very often, there is a need to permit remote code from one source access to one set of computer resources while permitting remote code from another source access to another set of computer resources. For example, there may be a need to limit access to a one set of files associated with one bank to remote code loaded over a network from a source associated with that one bank, and limit access to another set of files associated with another bank to remote code loaded over a network from a source associated with the other bank.

Providing security measures that allow more granularity than the sand box method involves establishing a complex set of relationships between principals and permissions. A "principal" is an entity in the computer system to which permissions are granted. Examples of principals include processes, objects and threads. A "permission" is an authorization by the computer system that allows a principal to perform a particular action or function.

Establishing sets of permissions for principals that may be received from multiple sources on a vast network, such as the Internet, typically requires developing complex security software. After such security software is developed, it must often be changed in order to meet changing security requirements. Often, changing security requirements entail modifying permissions or creating new kinds of permissions. Typically, the security software of a computer system must be reprogrammed to incorporate these new kinds of permissions. Programming security software requires substantial effort and in-depth knowledge about a computer's security mechanisms and a computer's architecture.

Based on the foregoing, it is clearly desirable to develop a method which reduces the effort and in-depth knowledge required to modify permissions established for the sources of code being executed by a computer system. It is further desirable to develop a method which reduces the effort and in-depth knowledge required to create new permissions.

SUMMARY OF THE INVENTION

A method and system are provided for implementing security policies within a computer system. The security mechanism makes use of structures referred to herein as "protection domains" to organize, represent and maintain the security policies that apply to the computer system.

According to one aspect of the invention, protection domains are established based on policy data, where each protection domain is associated with zero or more permissions. An association is established between the protection domains and classes of objects (i.e. instantiations of the classes) that may be invoked by the computer system. When an object requests an action, a determination is made as to whether the action is permitted for that object. The determination is based on the association between the protection domains and the classes. For example, based on policy data, an association between Class CA and protection domain PA, and class CB and protection domain PB is established. Protection domain PA and protection domain PB are each associated with a set of permissions. Object OA belongs (i.e. is an instantiation of) to class CA. When object OA requests an action, a determination of whether the action is permitted is based on the permissions associated with protection domain PA, because protection domain PA is associated class CA.

According to another aspect of the invention, each protection domain and class is associated with a code identifier. An association between the protection domains and the classes is based on the code identifier. The code identifier may contain data describing the source of code that defines a class, a set of public cryptographic keys associated with the source of code, or other information which describes the source of code, or any combination thereof. A "source of code" is an entity from which computer instructions are received. Examples of sources of code include a file or persistent object stored on a data server connected over a network, a FLASH_EPROM reader that reads instructions stored on a FLASH_EPROM, or a set of system libraries.

The association between protection domains and code identifiers is typically recorded in data persistently stored in the computer system. The data associates code identifiers with one or more permissions. For example, the code identifier associated with class CA has a value "A.host/fileA", indicating that the source of class CA is A.hostA/fileA, a file on host A connected over the Internet. A security policy file associates permission 1 and permission 2 with A.host/A.fileA. Protection domain A, which is associated with a code identifier having a value of "A.hostA/fileA", contains permission 1 and permission 2. Protection domain A is associated class CA, because protection domain A and protection domain are associated with the same code identifier value, "A.host/fileA".

According to another aspect of the invention, when executing code causes a request for an action, a determination is made as to whether the action is permitted. The determination is based on the source of code of the code causing the request and the association between protection domains and sources of code executed by the computer system. According to another aspect of the invention, the association between protection domains and the sources of code is also based on public cryptographic keys associated with the sources of code. For example, code causing a request is from source A.host/fileA, and protection domain A is associated is A.host/fileA. A determination of whether the request may be honored is based on the protection domain A, and in particular, to the permissions associated with protection domain A.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is block diagram showing an exemplary policy file in accordance with an embodiment of the present invention;

DETAILED DESCRIPTION OF THE PREFERRED EMBODIMENT

A method and apparatus for providing security through the use of protection domains is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
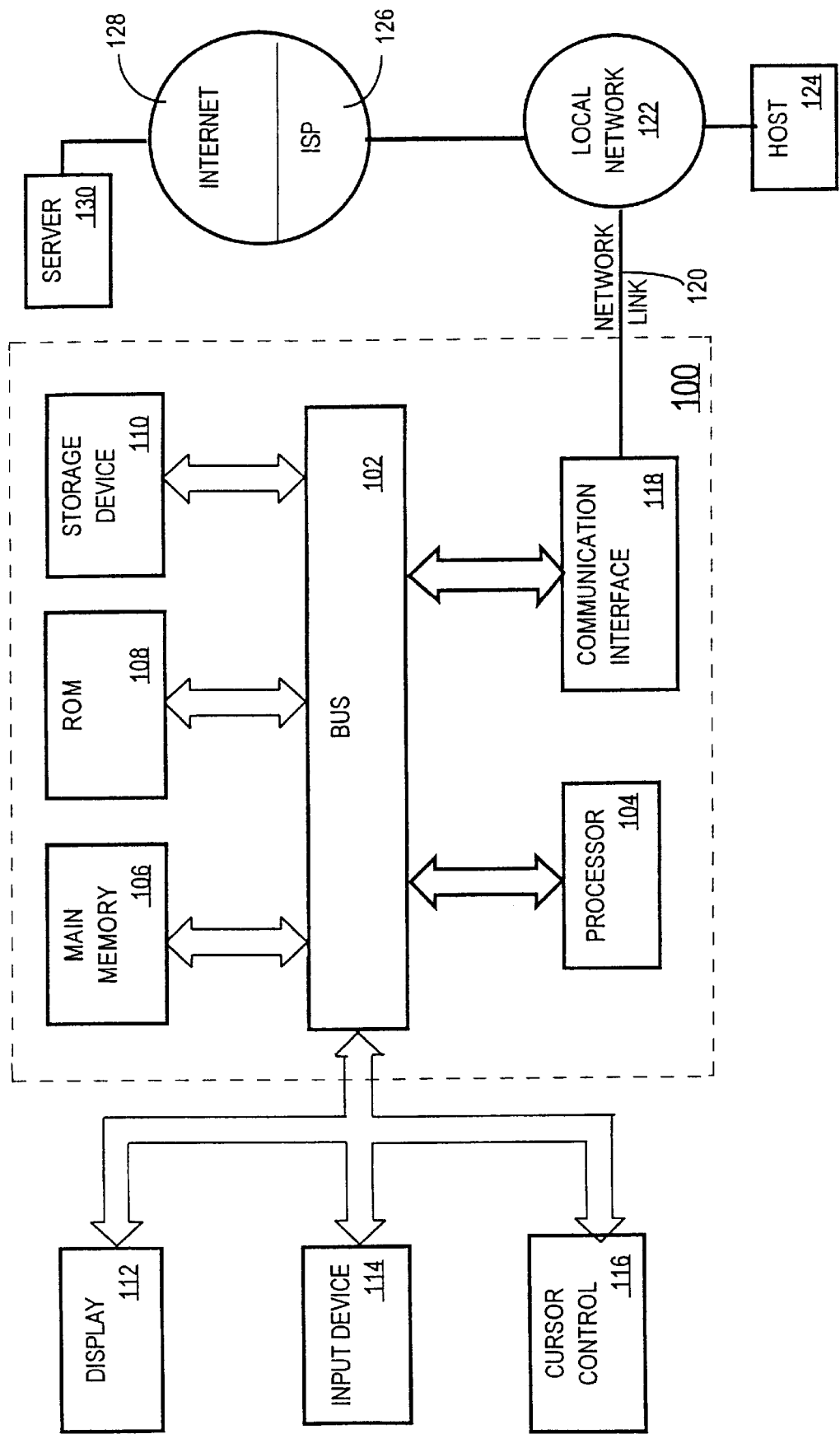
FIG. 1 is a block diagram of a computer system on which the present invention may be implemented in accordance with an embodiment of the present invention.

FIG. 1 is a block diagram which illustrates a computer system 100 upon which an embodiment of the invention may be implemented. Computer system 100 includes a bus 102 or other communication mechanism for communicating information, and a processor 104 coupled with bus 102 for processing information. Processor 104 generally represents one or more processors capable of executing instructions that conform to a particular instruction set. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by processor 104. Computer system 100 also includes a read only memory (ROM) 108 or other static storage device coupled to bus 102 for storing static information and instructions for processor 104. A storage device 110, such as a magnetic disk or optical disk, is also provided and coupled to bus 102 for storing information and instructions.

Computer system 100 may also be coupled via bus 102 to a display 112, such as a cathode ray tube (CRT), for displaying information to a computer user. An input device 114, including alphanumeric and other keys, is also provided and coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of computer system 100 for the implementation of protection domains. According to one embodiment of the invention, the implementation of protection domains is provided by computer system 100 in response to processor 104 executing sequences of instructions contained in main memory 106. Such instructions may be read into main memory 106 from another computer-readable medium, such as storage device 110. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer 100 also includes a communication interface 118 coupled to bus 102. Communication interface 118 provides a two-way data communication coupling to a network link 120 to a local network 122. For example, if communication interface 118 is an integrated services digital network (ISDN) card or a modem, communication interface 118 provides a data communication connection to the corresponding type of telephone line. If communication interface 118 is a local area network (LAN) card, communication interface 118 provides a data communication connection to a compatible LAN. Wireless links are also possible. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer 100 are exemplary forms of carrier waves transporting the information.

Computer 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer 100 may obtain application code in the form of a carrier wave.

In alternative embodiments, hard-wired circuitry may be used in place of or in combination with software instructions to implement the present invention. Thus, the present invention is not limited to any specific combination of hardware circuitry and software.

Functional Overview

As mentioned above, systems that allow execution of software from remote sources present difficult security problems. The systems that have been developed to address those problems are complex, often requiring the use of elaborate permission rules to deal with principals received from numerous sources. As the security needs of the systems change, the permission rules must be updated by someone who understands the complexities of the system.

According to one aspect of the invention, the complexities associated with elaborate permission rules and systems are reduced by establishing dynamically constructing and establishing protection domains for code that arrives for execution on a computer system. The protection domains embody sets of permissions and are constructed based on policy information.

The use of the protection domains provides a relatively simple mechanism to implement otherwise complex security policies. As the security needs of a system changes, the security mechanism described herein allows easy modification to adapt to the changes, without requiring specialized knowledge of complex security-management techniques.

Exemplary Security Mechanism

Figure 2:
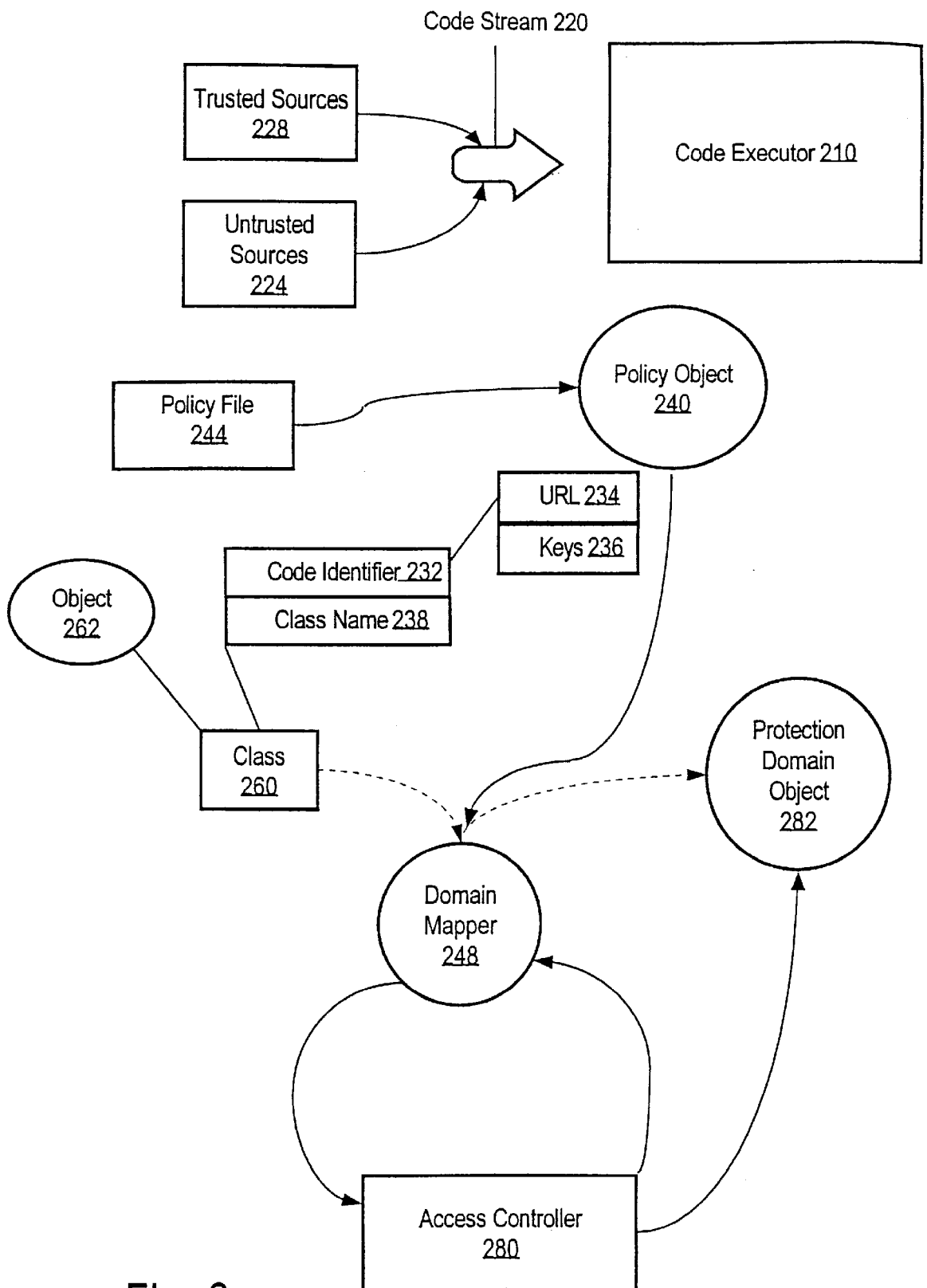
FIG. 2 is a block diagram showing the objects used by a code executor implementing protection domains in accordance with an embodiment of the present invention.

An exemplary security mechanism illustrating the use of protection domains is shown in FIG. 2. Referring to FIG. 2, the exemplary security mechanism includes a policy file 244, a policy object 240, a domain mapper object 248, an access controller 280, and one or more protection domains 282. The security mechanism is implemented using a code executor 210.

Code executor 210 executes code which code executor 210 receives from code stream 220. One example of a code executor is a Java virtual machine. A Java virtual machine interprets code called byte code. Byte code is code generated by a Java compiler from source files containing text. The Java virtual machine is described in detail in Tim Lindholm & Frank Yellin, *The Java Virtual Machine Specification* (1996).

For the purposes of explanation, it shall be assumed that code from code stream 220 is object oriented software. Consequently, the code is in the form of methods associated with objects that belong to classes. In response to instructions embodied by code executed by code executor 210, code executor 210 creates one or more objects 240. An object is a record of data combined with the procedures and functions that manipulate the record. All objects belong to a class. Each object belonging to a class has the same fields ("attributes") and the same methods. The methods are the procedures, functions, or routines used to manipulate the object. An object is said to be an "instance" of the class to which the object belongs.

One or more class definitions are contained in code from code stream 220. The fields and methods of the objects belonging to a class are defined by a class definition. These class definitions are used by code executor 210 to create objects which are instances of the classes defined by the class definitions.

These class definitions are generated from source code written by a programmer. For example, a programmer using a Java Development Kit enters source code that conforms to the Java programming language into a source file. The source code embodies class definitions and other instructions which are used to generate byte code which controls the execution of a code executor (i.e. a Java virtual machine). Techniques for defining classes and generating code executed by a code executor, such as a Java virtual machine, are well known to those skilled in the art.

Each class defined by a class definition from code stream 220 is associated with a class name 238 and a code source 236. Code executor 210 maintains an association between a class and its class name and code source.

The code source may be a composite record containing a uniform resource locator ("URL") 234 and set of public cryptographic keys 236. A URL identifies a particular source. The URL is a string used to uniquely identify any server connected to the world wide web. A URL may also be used to designate sources local to computer system 100. Typically, the URL includes the designation of the file and directory of the file that is the source of the code stream that a server is providing.

A public cryptographic key, herein referred to as a key, is used to validate the digital signature which may be included in a file used to transport related code and data. Public cryptographic keys and digital signatures are described in Schneier, *Applied Crytography*, (1996). The keys may be contained in the file, may be contained in a database associating keys with sources (e.g. URLs), or be accessible using other possible alternative techniques.

A class may be associated with the digital signature associated with the file used to transport code defining the class, or the class definition of the class may be specifically associated with a digital signature. A class that is associated with a valid digital signature is referred to as being signed. Valid digital signatures are digital signatures that can be verified by known keys stored in a database. If a class is associated with a digital signature which can not be verified, or the class is not associated with any digital signature, the class is referred to as being unsigned. Unsigned classes may be associated with a default key. A key may be associated with a name, which may be used to look up the key in the database.

Trusted and Untrusted Sources

The source of code stream 220 may be from zero or more untrusted sources 224 or zero or more trusted sources 228. Untrusted sources 224 and trusted sources 228 may be file servers, including file servers that are part of the World Wide Web network of servers connected to the Internet. An untrusted source is typically not under the direct control of the operators of computer system 100. Code from untrusted sources is herein referred to as untrusted code.

Because untrusted code is considered to pose a high security risk, the set of computer resources that untrusted code may access is usually restricted to those which do not pose security threats. Code from a trusted source is code usually developed by trusted developers. Trusted code is considered to be reliable and pose much less security risk than remote code.

Software code which is loaded over the network from a remote source and immediately executed is herein referred to as remote code. Typically, a remote source is a computer system of another separate organization or individual. The remote source is often connected to the Internet.

Normally untrusted code is remote code. However, code from sources local to computer system 100 may pose a high security risk. Code from such local sources may be deemed to be untrusted code from an untrusted source. Likewise, code from a particular remote source may be considered to be reliable and to pose relatively little risk, and thus may be deemed to be trusted code from a trusted resource.

According to one embodiment of the invention, an access controller is used in conjunction with protection domains to implement security policies that allow trusted code to access more resources than untrusted code, even when the trusted and untrusted code are executed by the same principal. A security policy thus established determines what actions code executor 210 will allow the code within code stream 220 to perform. The use of typed permissions and protection domains allows policies that go beyond a simple trusted/untrusted dichotomy by allowing relatively complex permission groupings and relationships.

Protection domains, permissions and policies that may be used to establish the access rights of code shall now be described in greater detail with continued reference to FIG. 2.

Protection Domains and Permissions

According to an embodiment of the present invention, protection domains are used to enforce security within computer systems. A protection domain can be viewed as a set of permissions granted to one or more principals. A permission is an authorization by the computer system that allows a principle to execute a particular action or function. Typically, permissions involve an authorization to perform an access to a computer resource in a particular manner. An example of an authorization is an authorization to "write" to a particular directory in a file system (e.g./home).

A permission can be represented in numerous ways in a computer system. For example, a data structure containing text instructions can represent permissions. An instruction such as "permission write/somedirectory/somefile" denotes a permission to write to file "somefile" in the directory "/somedirectory." The instruction denotes which particular action is authorized, and the computer resource upon which that particular action is authorized. In this example, the particular action authorized is to "write." The computer resources upon which the particular action is authorized is a file ("/somedirectory/somefile") in a file system of computer system 100. Note that in the example provided the file and the directory in which the file is contained are expressed in a conventional form recognized by those skilled in the art.

Permissions can also be represented by objects, herein referred to as permission objects. Attributes of the object represent a particular permission. For example, an object can contain an action attribute of "write," and a target resource attribute of "/somedirectory." A permission object may have one or more permission validation methods which determine whether a requested permission is authorized by the particular permission represented by the permission object.

Policies

The correlation between permissions and principals constitutes the security policy of the system. FIG. 2 illustrates an exemplary policy implemented through use of a policy file 244. A protection domain in this exemplary policy is defined as the set of permissions granted to the objects associated with a particular code identifier. The policy of the system is represented by one or more files containing instructions. The instructions map code identifiers to authorized permissions. Each instruction establishes a mapping between a particular code identifier and a particular authorized permission. An instruction represents one authorized permission for the objects belonging to the classes associated with the code identifier in the instruction.

Storing instructions in a file is just one method of representing the policy of the system with persistently stored data. Other methods are possible for representing the policy with persistent data. For example, data in a database system can be used to map code identifiers to authorized permissions, or attributes of a persistent object can be used to map code identifiers to authorized permissions.

FIG. 3 illustrates exemplary policy file 244. The format of an instruction in exemplary policy file 244 is:

<"permission"><URL><key name><action><target>
The <URL> and <key name> represent a code identifier; the <action> and <target> represent a permission. The key name is associated with a key. The key and corresponding key name are stored together in a database. The key name can be used to find the key in the database. Instruction 320-1 in FIG. 3, for example, is therefore an authorization of a permission to write to any file in "/tmp/*" by any object of the classes associated with code identifier "file://somesource"-"somekey" (i.e. URL-key).

Establishing Protection Domains

In order to efficiently and conveniently implement the policy and establish protection domains, policy object 240, domain mapper object 248, and one or more protection domain objects 282 are provided. The policy object 240 and domain mapper 248 are initialized during the initialization of code executor 210. A protection domain object 282 is created in a manner which shall be described. When the domain mapper is initialized, each instruction in the policy file 244 is parsed to generate a list representation of the code identifier/authorized permission combinations that together represent the policy. Each entry in the list represents a code identifier/authorized permission pair. Code identifiers and authorized permissions may each be represented with data structures or objects.

Figure 4:
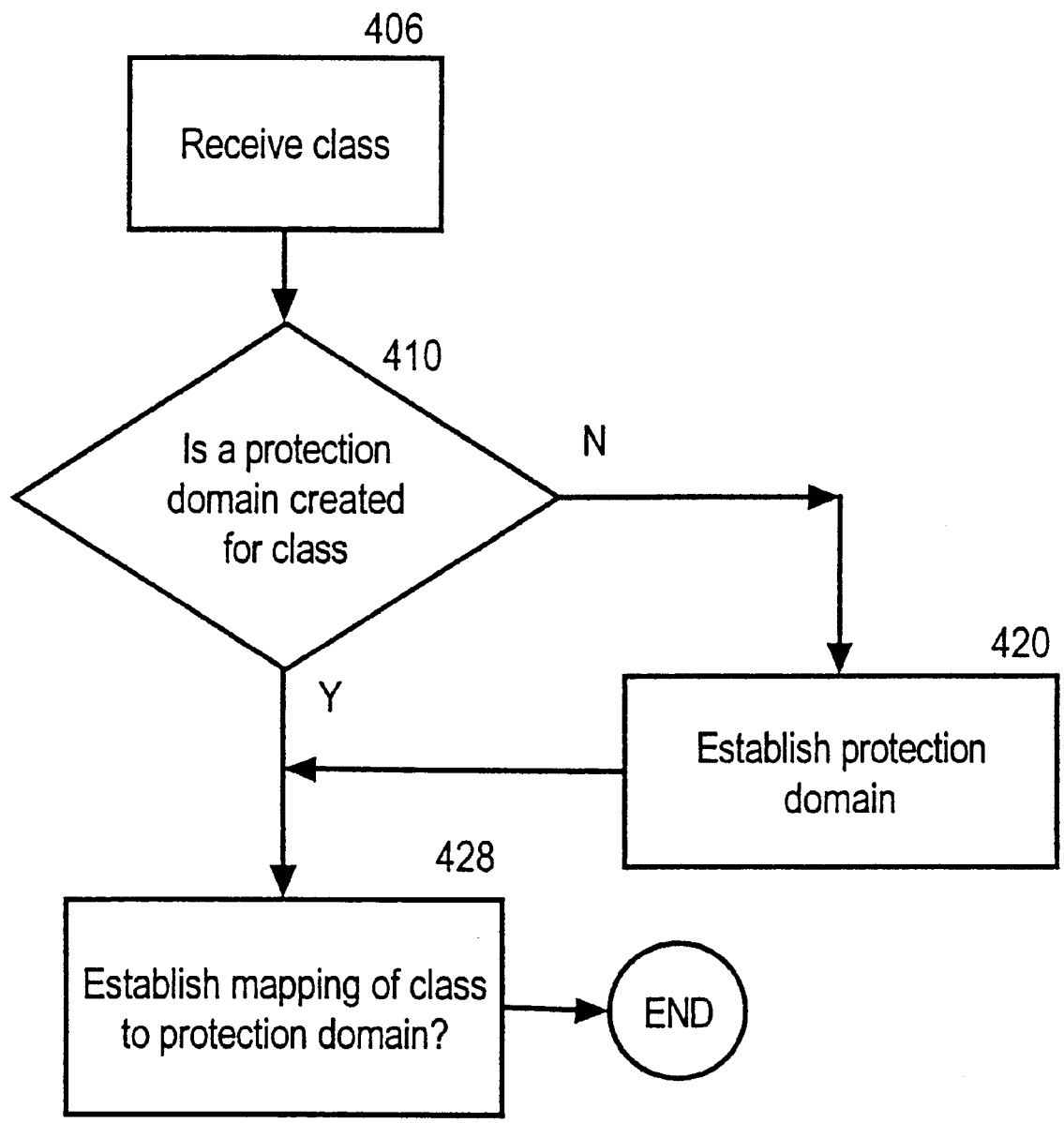
FIG. 4 is a flow chart showing the steps involved in implementing protection domains in accordance with an embodiment of the present invention.

A method for establishing protection domains authorized for an object executing on computer system 200 shall now be described with reference to steps shown in FIG. 4. The exemplary code executor 210 and objects shown in FIG. 3 will be used as example. In step 406, a class definition is received from code stream 220 by code executor 210. Note that the code identifier of the class is also received. The class defined by a class definition received by the code executor 210 is herein referred to as a received class. In some methods of implementing a code executor, such as a Java virtual machine, a class loader is invoked. The class loader loads code from code stream 220 that defines a class, and then executes the steps 410 to 428 in manner which shall be described.

In the present example, assume that object 262 and protection domain object 282 have not yet been created, and that code executor is receiving the class definition for the class 260 defining object 262. In step 406, the code identifier received for class 260 is "file://somesource"-"somekey" (i.e. URL-key). Code executor 210 then invokes a class loader.

In step 410, a determination is made as to whether a protection domain object 282 is established for the code identifier associated with the received class. The determination is made by invoking a method of a domain mapper 248. The method returns the protection domain object for a given code identifier, if a protection domain object has been established for the given code identifier. The domain mapper maintains data indicating which protection domain objects 282 have been created and mapping of protection domain objects 282 to the one or more codes sources that may be associated with each protection domain object.

If no protection domain object is returned, then there is no protection domain established for the code identifier. Control then passes to step 420. In the present example, the data in the domain mapper indicating which protection domain objects 282 have been created and the code identifiers associated with each indicates there is no protection domain associated with the code identifier "file:/somesource"-"somekey" list of protection domain objects. Therefore, control passes to step 420.

In step 420 a protection domain is established for the code identifier associated the received class. The protection domain is created by first invoking a method of policy object 240, passing as a parameter the code identifier associated with the received class. In return, the policy object, which contains a mapping of all code identifier/authorized permissions, transmits a message having data indicating the mapping of the code identifier to the one or more authorized permissions mapped to the code identifier. The authorized permissions may be transmitted by, for example, returning a permissions container object. Then a protection domain object is created, using the permissions container object to populate the protection domain.

In the present example, the method of the policy object which returns the permissions associated with a code identifier is invoked passing the code identifier, "file://somesource"-"somekey," as a parameter. The policy object returns a permissions container object containing all the permissions associated with the code identifier "file://somesource" -"somekey." There is only one permission associated with the code identifier "file://somesource"-"somekey", which is a permission to write to any file in directory "Itmp/*". Then protection domain object 282 is created and populated with the permission just mentioned.

Note the policy object may determine that no protection domain is defined for a code identifier. In this case, a default protection domain is provided. Typically, a default protection domain contains permissions posing no risk to the security of computer system 100.

Next, in step 428, the mapping of the class to the protection domain is established. The mapping of the class to the protection domain is added to a mapping data structure maintained within the domain mapper 248. In this example, a mapping between class 260 and protection domain object 282 is created.

Creating an association of classes to protection domains in the manner just described offers several advantages. First, because the permissions authorized to an object are based on the code identifier associated with the object's class, an object's permission can based on the source of code creating the object. This enables authorization of permissions to be organized according to the source of code executed by code executor 210. This ability facilitates development of more granular security mechanisms. For example, objects based on code from a first untrusted source can be granted one set of permissions and objects based on code from a second untrusted source can be granted a second set of permissions In addition to being able to organize a policy with greater granularity, the policy can be configured with very little programming or in-depth knowledge of security systems. As described earlier, simple instructions can be entered and received by the computer system and stored in a policy file. The policy file is then used by the computer system to establish the security policy for the system.

In other embodiments of the invention, instead of storing the mapping of classes to protection domains in a domain mapper object, the mapping is stored as static fields in the protection domain class. The protection domain class is the class to which protection domain objects belong. There is only one instance of a static field for a class no matter how many objects belong to the class. The data indicating which protection domains have been created and the code identifiers associated with the protection domains is stored in static fields of the protection domain class. Alternatively, a mapping between a class and protections domains associated with the class is stored as static fields in the class.

Static methods are used to access and update the static data mentioned above. Static methods are invoked on behalf of the entire class, and may be invoked without referencing a specific object.

Exemplary Access Control

Figure 5:
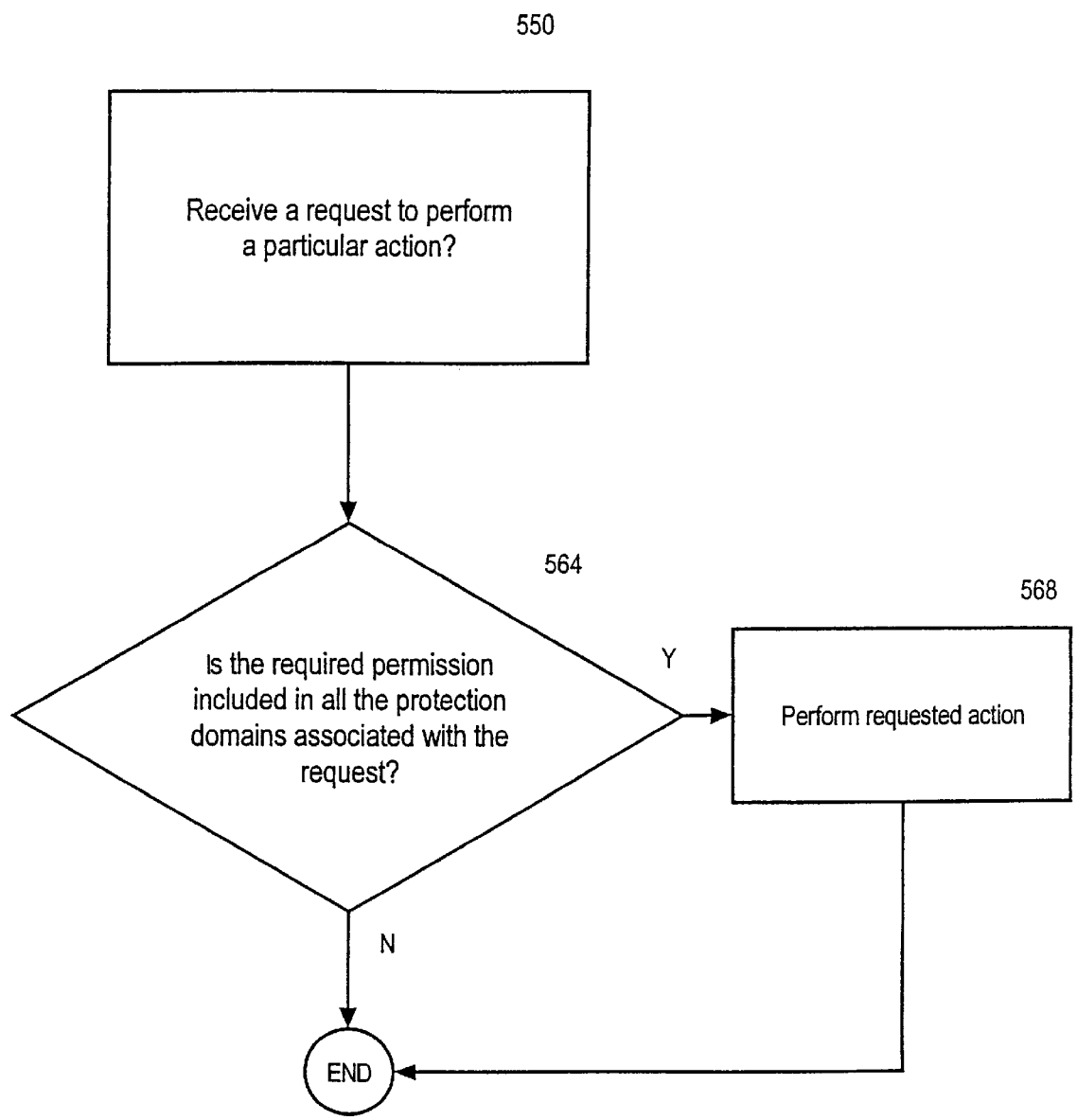
FIG. 5 is a flow chart showing the steps followed by an access controller using an implementation of protection domains in accordance with an embodiment of the present invention.

An exemplary method using access controller 280 according to steps shown in FIG. 5 will illustrate a use of objects and data structures described above. The calling stack 610 and protection domains shown in FIG. 6 are used as an example illustrating the performance of the steps shown in FIG. 5.

A code executor, such as a Java virtual machine, maintains for each thread or process a call stack of the object methods invoked by the thread or process. The call stack reflects the calling hierarchy between the methods that have been invoked but not yet completed by the thread or process. The call stack includes information identifying the objects with methods on the call stack. For example, assume that a thread executes a.x (where "a" is an object and "x" is a method associated with object "a"). Assume that a.x invokes b.y which invokes c.z. While c.z is executing, the call stack will contain data identifying a.x, b.y, and c.z. At this point, call stack 610 represents the calling hierarchy of the methods invoked by the thread but have not yet been completed by the thread. When the thread finishes execution of c.z, the data identifying c.z will be removed from the call stack.

Note that objects corresponding to the method invocations in the call stack are each associated with a protection domain. Object a is associated with protection domain I and object b and object c are associated with protection domain J. Each protection domain object is associated with permission objects. The association between the objects, permission domain objects and the permission objects is based on the domain mapper, policy object, a policy file, and constitutes the security policy with respect to the objects shown in FIG. 6.

Figure 6:
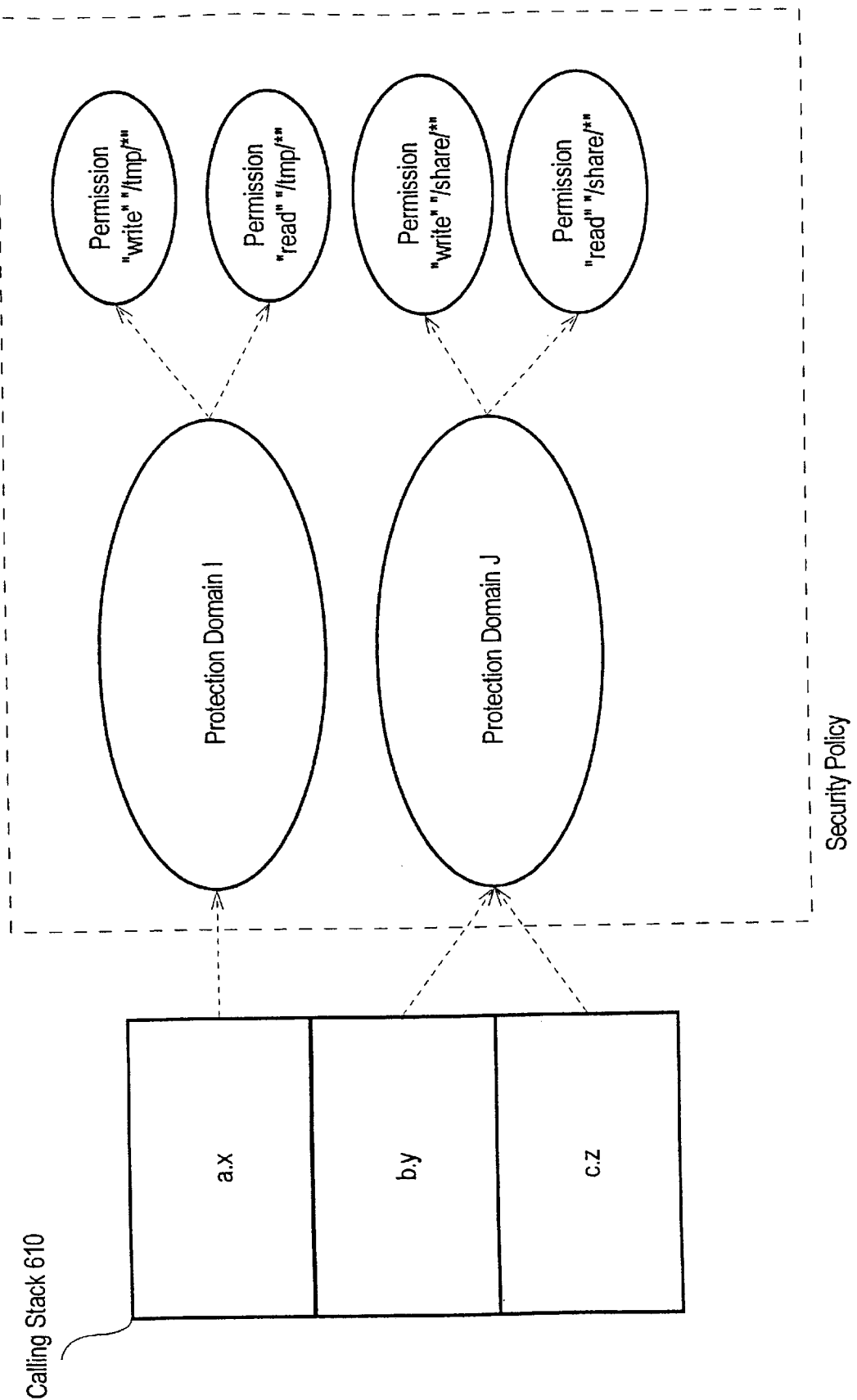
FIG. 6 is a block diagram showing a call stack representing objects associated with protection domains and permissions in accordance with an embodiment of the present invention.

Assume that a thread invokes a.x, b.y, and c.z in the manner described so that call stack 610 is as it appears in FIG. 6. Referring to FIG. 5, assume in step 550 a request to perform a particular action is then received from the thread while thread is executing c.z. Typically, a request is in the form of an attempt to invoke a particular method that performs a particular operation. In this example, the particular request is made by object a. In other words, a method associated with object a invoked a method that may perform the particular action. Object a is requesting to write to file "/tmp/temporary". The permission required to perform this action is a "write" permission for file "/tmp/temporary". The permission required to perform a requested action is herein referred to as a required permission.

Typically, access to a resource by code being executed by a code executor can only be made by invoking a resource manager. A resource manager is an object assigned the responsibility of managing access to its respective resource. A resource manager receives the request from object a. In response to receiving the request from object a, the resource manager assigned to manage the file system invokes an access controller. The access controller determines whether the permission required is authorized for the entity requesting access. In this example, access controller 280 is invoked by the resource manager that received the request from object c.

In step 564, a determination is made as to whether the required permission for the requested action is included in the protection domains associated with the request to perform an action. The protection domains associated with the request are the protection domains associated with each object represented in the call stack when the request for access was made. A requested action is authorized if every protection domain associated with the objects represented by the call stack when the request for the requested action was made contains a permission authorizing the permission required to perform the requested action. Each permission object of each particular protection domain object associated with each object represented by the call stack is examined in order to determine whether the permission object authorizes the required permission.

Examining the permissions of a particular protection domain associated with an object begins by determining an object's class. A code executor, such as a Java virtual machine, provides that each object incorporates a method which returns the class of an object. In this example, the first object with a method on the call stack is object a. Access controller 280 invokes the method that returns the class of object a.

Next, the method of the class/domain mapper that returns the protection domain object associated with a class is invoked. Each permission in the returned protection domain object is examined until it is determined whether any permission in the protection domain authorizes the required permission.

The validation method of each permission object in the returned protection domain object is invoked until the validation method of a permission object indicates that the required permission is authorized. As mentioned earlier, a permission object contains a permission validation method which indicates whether a particular permission is authorized by the permission represented by the permission object. When a protection domain is encountered that does not contain a permission authorizing the required permission, then execution of the steps ceases. If every permission object contained by the protection domain authorizes the required permission, then the next protection domain for the next object represented on the calling stack is examined, if any. After the last protection domain is examined and found to contain the required permission, control passes to step 568, where the action is performed.

In this example, protection domain object I is returned as the protection domain associated with the class of object a. The first permission object in protection domain object a represents an authorized permission to write to any file in directory "/tmp". When the validation method of the first permission object is invoked the validation method indicates that the required permission is authorized.

Access controller 280 then examines the protection domain for the class of the next object represented in the call stack, which is b. Protection domain object J is the protection domain associated with the class of object b. The first permission object in protection domain object J represents an authorized permission to write to any file in directory "/share". When the validation method of the first permission object is invoked the validation method indicates that the required permission is authorized. The next permission object is examined. When the validation method of the second permission object is invoked the validation method indicates that the required permission is not authorized. Thus execution of the steps ceases 560.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing security, the method comprising the steps of:
   establishing one or more protection domains, wherein a protection domain is associated with zero or more permissions;
   establishing an association between said one or more protection domains and one or more classes of one or more objects; and
   determining whether an action requested by a particular object is permitted based on said association between said one or more protection domains and said one or more classes.

2. The method of claim 1, wherein:
   at least one protection domain of said one or more protection domains is associated with a code identifier;
   at least one class of said one or more classes is associated with said code identifier; and
   the step of establishing an association between said one or more protection domains and said one or more classes of one or more objects further includes the step of associating said one or more protection domains and said one or more classes based on said code identifier.

3. The method of claim 2, wherein said code identifier indicates a source of code used to define each class of said one or more classes.

4. The method of claim 2, wherein said code identifier indicates a key associated with each class of said one or more classes.

5. The method of claim 2, wherein said code identifier indicates a source of code used to define each class of said one or more classes and indicates a key associated with each class of said one or more classes.

6. The method of claim 2, wherein the step of associating said one or more protection domains and said one or more classes based on said code identifier further includes associating said one or more protection domains and said one or more classes based on data persistently stored, wherein said data associates code identifiers with a set of one or more permissions.

7. A method of providing security, the method comprising the steps of:
   establishing one or more protection domains, wherein a protection domain is associated with zero or more permissions;
   establishing an association between said one or more protection domains and one or more sources of code; and
   in response to executing code making a request to perform an action, determining whether said request is permitted based on a source of said code making said request and said association between said one or more protection domains and said one or more sources of code.

8. The method of claim 7, wherein the step of establishing an association between said one or more protection domains and said one or more sources of code further includes establishing an association between said one or more protection domains and said one or more sources of code and one or more keys associated with said one or more sources of code.

9. The method of claim 8, wherein the step of establishing an association between said one or more protection domains and said one or more sources of code and said one or more keys associated with said one or more sources of code further includes establishing said association between said one or more protection domains and said one or more sources of code and said one or more keys associated with said one or more sources of code based on data persistently stored, wherein said data associates particular sources of code and particular keys with a set of one or more permissions.

10. A computer-readable medium carrying one or more sequences of one or more instructions, the one or more sequences of the one or more instructions including instructions which, when executed by one or more processors, causes the one or more processors to perform the steps of:
    establishing one or more protection domains, wherein a protection domain is associated with zero or more permissions;
    establishing an association between said one or more protection domains and one or more classes of one or more objects; and
    determining whether an action requested by a particular object is permitted based on said association between said one or more protection domains and said one or more classes.

11. The computer readable medium of claim 10, wherein:
    at least one protection domain of said one or more protection domains is associated with a code identifier;
    at least one class of said one or more classes is associated with said code identifier; and
    the step of establishing an association between said one or more protection domains and said one or more classes of one or more objects further includes the step of associating said one or more protection domains and said one or more classes based on said code identifier.

12. The computer readable medium of claim 11, wherein said code identifier indicates a source of code used to define each class of said one or more classes.

13. The computer readable medium of claim 11, wherein said code identifier indicates a key associated with each class of said one or more classes.

14. The computer readable medium of claim 11, wherein said code identifier indicates a source of code used to define each class of said one or more classes and indicates a key associated with each class of said one or more classes.

15. The computer readable medium of claim 14, wherein the step of associating said one or more protection domains and said one or more classes based on said code identifier further includes associating said one or more protection domains and said one or more classes based on data persistently stored, wherein said data associates code identifiers with a set of one or more permissions.

16. A computer-readable medium carrying one or more sequences of one or more instructions, wherein the execution of the one or more sequences of the one or more instructions causes the one or more processors to perform the steps of:

establishing one or more protection domains, wherein a protection domain is associated with zero or more permissions;

establishing an association between said one or more protection domains and one or more sources of code; and in response to executing code making a request to perform an action, determining whether said request is permitted based on a source of said code making said request and said association between said one or more protection domains and said one or more sources of code.

17. The computer readable medium of claim 16, wherein the step of establishing an association between said one or more protection domains and said one or more sources of code further includes establishing an association between said one or more protection domains and said one or more sources of code and one or more keys associated with said one or more sources of code.

18. The computer readable medium of claim 17, wherein the step of establishing an association between said one or more protection domains and said one or more sources of code and said one or more keys associated with said one or more sources of code further includes establishing said association between said one or more protection domains and said one or more sources of code and said one or more keys associated with said one or more sources of code based on data persistently stored, wherein said data associates particular sources of code and particular keys with a set of one or more permissions.

19. A computer system comprising:

a processor;

a memory coupled to said processor;

one or more protection domains stored as objects in said memory, wherein each protection domain is associated with zero or more permissions;

a domain mapping object stored in said memory, said domain mapping object establishing an association between said one or more protection domains and one or more classes of one or more objects; and said processor being configured to determine whether an action requested by a particular object is permitted based on said association between said one or more protection domains and said one or more classes.

20. The computer system of claim 19, wherein:

at least one protection domain of said one or more protection domains is associated with a code identifier;

at least one class of said one or more classes is associated with said code identifier; and said computer system further comprises said processor configured to establish an association between said one or more protection domains and said one or more classes of one or more objects by associating said one or more protection domains and said one or more classes based on said code identifier.

21. The computer system of claim 20, wherein said code identifier indicates a source of code used to define each class of said one or more classes.

22. The computer system of claim 20, wherein said code identifier indicates a key associated with each class of said one or more classes.

23. The computer system of claim 20, wherein said code identifier indicates a source of code used to define each class of said one or more classes and indicates a key associated with each class of said one or more classes.

24. The computer system of claim 20, further comprising said processor configured to associate said one or more protection domains and said one or more classes based on said code identifier by associating said one or more protection domains and said one or more classes based on data persistently stored in said computer system, wherein said data associates code identifiers with a set of one or more permissions.

* * * * *

(12) EX PARTE REEXAMINATION CERTIFICATE (9461st)
United States Patent
Gong

(10) Number: US 6,125,447 C1
(45) Certificate Issued: Jan. 2, 2013

(54) PROTECTION DOMAINS TO PROVIDE SECURITY IN A COMPUTER SYSTEM

(75) Inventor: Li Gong, Menlo Park, CA (US)

(73) Assignee: Sun Microsystems, Inc., Mountain View, CA (US)

Reexamination Request:
No. 90/011,491, Feb. 15, 2011

Reexamination Certificate for:
Patent No.: 6,125,447
Issued: Sep. 26, 2000
Appl. No.: 08/988,439
Filed: Dec. 11, 1997

(51) Int. Cl.
*G06F 9/46* (2006.01)
*G06F 1/00* (2006.01)
*G06F 21/00* (2006.01)
*G06F 12/14* (2006.01)
*H04L 9/00* (2006.01)

(52) U.S. Cl. .................................. 726/17; 713/154
(58) Field of Classification Search .................. None
See application file for complete search history.

(56) References Cited

To view the complete listing of prior art documents cited during the proceeding for Reexamination Control Number 90/011,491, please refer to the USPTO's public Patent Application Information Retrieval (PAIR) system under the Display References tab.

*Primary Examiner* — Mary Steelman

(57) ABSTRACT

A method and apparatus are provided for maintaining and enforcing security rules using protection domains. As new code arrives at a computer, a determination is assigned to a protection domain based on the source from which the code is received. The protection domain establishes the permissions that apply to the code. In embodiments where the code to be executed by the computer belongs to object classes, an association is established between the protection domains and the classes of objects. When an object requests an action, a determination is made as to whether the action is permitted based on the class to which the object belongs and the association between classes and protection domains.

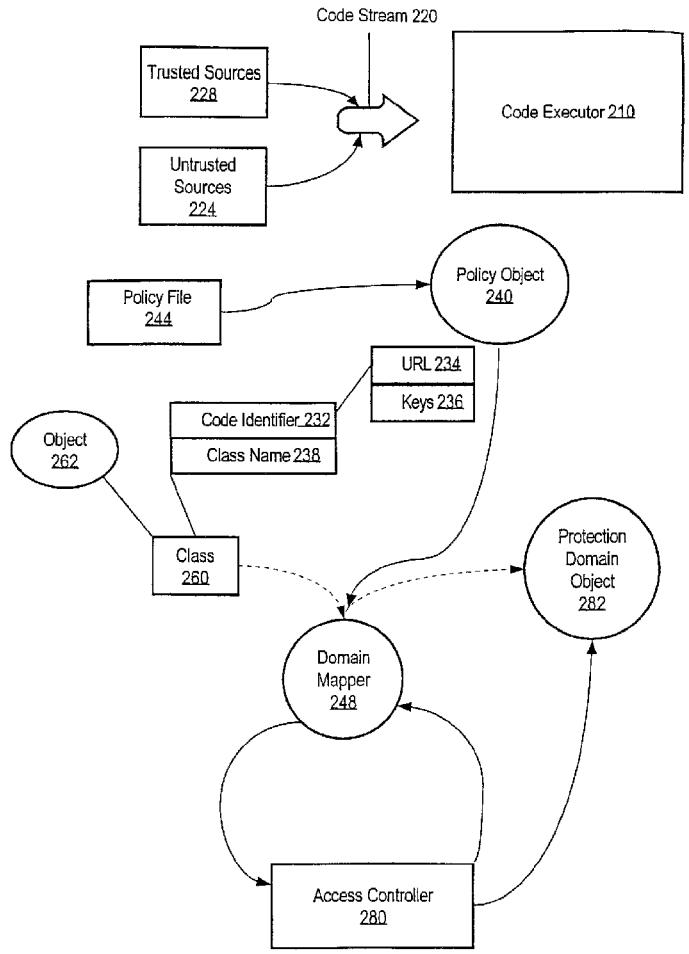

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-23 and 24 are determined to be patentable as amended.

1. A method for providing security, the method comprising the steps of:
   establishing [one] *two* or more protection domains, wherein a protection domain is associated with zero or more permissions;
   establishing [an association] *associations* between said [one] *two* or more protection domains and [one] *two* or more classes of [one or more objects; and] *a single process, such that:*
   *at least two different classes of the single process are associated with different protection domains; and*
   *said different protection domains are associated with different sets of permissions; and*
   determining whether an action requested by a particular object *of a particular class of said at least two different classes* is permitted based on said association between [said one or more protection domains and said one or more classes] *the particular class and its protection domain*.

2. The method of claim 1, wherein:
   at least one protection domain of said [one] *two* or more protection domains is associated with a code identifier;
   at least one class of said [one] *two* or more classes is associated with said code identifier; and
   *further including* the step of establishing an association between [said one or more protection domains] *said at least one protection domain* and [said one or more classes of one or more objects further includes the step of associating said one or more protection domains and said one or more classes] *said at least one class* based on said code identifier.

3. The method of claim 2, wherein said code identifier indicates a source of code used to define [each] *said at least one* class of said [one] *two* or more classes.

4. The method of claim 2, wherein said code identifier indicates a key associated with [each] *said at least one* class of said [one] *two* or more classes.

5. The method of claim 2, wherein said code identifier indicates a source of code used to define [each] *said at least one* class of said [one] *two* or more classes and indicates a key associated with [each] *said at least one* class of said [one] *two* or more classes.

6. The method of claim 2, wherein the step of associating [said one or more protection domains] *said at least one protection domain* and [said one or more classes] *said at least one class* based on said code identifier further includes associating said [one or more protection domains] *at least one protection domain* and said [one or more classes] *at least one class* based on data persistently stored, wherein said data associates code identifiers with a set of one or more permissions.

7. A method of providing security, the method comprising the steps of:
   establishing [one] *two* or more protection domains, wherein a protection domain is associated with zero or more permissions;
   establishing [an association] *associations* between said [one] *two* or more protection domains and [one] *two* or more sources of code *of a single process, such that:*
   *at least two different sources of code of the single process are associated with different protection domains; and*
   *said different protection domains are associated with different sets of permissions*; and
   in response to executing code making a request to perform an action, determining whether said request is permitted based on a source of said code making said request and said association between [said one or more protection domains and said one or more sources of code] *said source of code and its associated protection domain*.

8. The method of claim 7, wherein the step of establishing [an association] *associations* between said [one] *two* or more protection domains and said [one] *two* or more sources of code *of a single process* further includes establishing [an association] *associations* between at least one of said [one] *two* or more protection domains and *at least one of* said [one] *two* or more sources of code and one or more keys associated with *said at least one of* said [one] *two* or more sources of code.

9. The method of claim 8, wherein the step of establishing [an association] *associations* between said [one] *at least one of said two* or more protection domains and said [one] *at least one of said two* or more sources of code and said one or more keys associated with said [one] *at least one of said two* or more sources of code further includes establishing said association between said [one] *at least one of said two* or more protection domains and said [one] *at least one of said two* or more sources of code and said one or more keys associated with said [one] *at least one of said two* or more sources of code based on data persistently stored, wherein said data associates particular sources of code and particular keys with a set of one or more permissions.

10. A computer-readable medium carrying one or more sequences of one or more instructions, the one or more sequences of the one or more instructions including instructions which, when executed by one or more processors, causes the one or more processors to perform the steps of:
    establishing [one] *two* or more protection domains, wherein a protection domain is associated with zero or more permissions;
    establishing [an association] *associations* between said [one] *two* or more protection domains and [one] *two* or more classes of [one or more objects] *a single process, such that:*
    *at least two different classes of the single process are associated with different protection domains; and*
    *said different protections domains are associated with different sets of permissions*; and determining whether an action requested by a particular object *of a particular class of said at least two different classes* is permitted based on said association between [said one or more protection domains and said one or more classes] *the particular class and its protection domain*.

11. The computer readable medium of claim 10, wherein:
    at least one protection domain of said [one] *two* or more protection domains is associated with a code identifier;

at least one class of said [one] *two* or more classes is associated with said code identifier; and

*further including* the step of establishing an association between [said one or more protection domains] *said at least one protection domain* and [said one or more classes of one or more objects further includes the step of associating said one or more protection domains and said one or more classes] *said at least one class* based on said code identifier.

12. The computer readable medium of claim 11, wherein said code identifier indicates a source of code used to define [each] *said at least one class* of said [one] *two* or more classes.

13. The computer readable medium of claim 11, wherein said code identifier indicates a key associated with [each] *said at least one* class of said [one] *two* or more classes.

14. The computer readable medium of claim 11, wherein said code identifier indicates a source of code used to define [each] *said at least one* class of said [one] *two* or more classes and indicates a key associated with [each] *said at least one* class of said [one] *two* or more classes.

15. The computer readable medium of claim 14, wherein the step of associating [said one or more protection domains] *said at least one protection domain* and [said one or more classes] *said at least one class* based on said code identifier further includes associating said [one or more protection domains] *said at least one protection domain* and [said one or more classes] *said at least one class* based on data persistently stored, wherein said data associates code identifiers with a set of one or more permissions.

16. A computer-readable medium carrying one or more sequences of one or more instructions, wherein the execution of the one or more sequences of the one or more instructions causes the one or more processors to perform the steps of:

establishing [one] *two* or more protection domains, wherein a protection domain is associated with zero or more permissions;

establishing [an association] *associations* between said [one] *two* or more protection domains and [one] *two* or more sources of code *of a single process, such that:*

*at least two different sources of code of the single process are associated with different protection domains; and*

*said different protection domains are associated with different sets of permissions*; and in response to executing code making a request to perform an action, determining whether said request is permitted based on a *particular* source of said code making said request and said association between [said one or more protection domains and said one or more sources of code] *the particular source of code and its protection domain*.

17. The computer readable medium of claim 16, wherein the step of establishing an association between [said one or more protection domains said one or more sources of code] *a protection domain and a source of code* further includes establishing an association between [said one or more protection domains said one or more sources of code and one or more keys associated with said one or more sources of code] *a protection domain and a source of code based on one or more keys associated with said source of code*.

18. The computer readable medium of claim 17, wherein the step of establishing an association between [said one or more protection domains] *a protection domain* and said [one or more sources of code] *source of code* and said one or more keys associated with said [one or more sources] *source of code* further includes establishing said association between said [one or more protection domains] *protection domain* and said [one or more sources] *source* of code and said one or more keys associated with said [one or more sources] *source* of code based on data persistently stored, wherein said data associates particular sources of code and particular keys with a set of one or more permissions.

19. A computer system comprising:

a processor;

a memory coupled to said processor;

[one] *two* or more protection domains stored as objects in said memory, wherein each protection domain is associated with zero or more permissions;

a domain mapping object stored in said memory, said domain mapping object establishing [an association] *associations* between said [one] *two* or more protection domains and [one] *two* or more classes of [one or more objects] *a single process, such that:*

*at least two different classes of the single process are associated with different protection domains; and*

*said different protection domains are associated with different sets of permissions*; and said processor being configured to determine whether an action requested by a particular object is permitted based on said association between [said one or more protection domains and said one or more classes] *the particular class and its protection domain*.

20. The computer system of claim 19, wherein:

at least one protection domain of said [one] *two* or more protection domains is associated with a code identifier;

at least one class of said [one] *two* or more classes is associated with said code identifier; and said computer system further comprises said processor configured to establish an association between said [said one or more protection domains and said one or more classes of one or more objects by associating said one or more protection domains and said one or more classes] *at least one protection domain and said at least one class* based on said code identifier.

21. The computer system of claim 20, wherein said code identifier indicates a source of code used to define [each] *said at least one* class of said [one] *two* or more classes.

22. The computer system of claim 20, wherein said code identifier indicates a key associated with [each] *said at least one* class of said [one] *two* or more classes.

23. The computer system of claim 20, wherein said code identifier indicates a source of code used to define [each] *said at least one* class of said [one] *two* or more classes and indicates a key associated with [each] *said at least one* class of said [one] *two* or more classes.

24. The computer system of claim 20, further comprising said processor configured to associate [said one or more protection domains] *a protection domain* and [said one or more classes] *a class* based on said code identifier by associating said [one or more protection domains and said one or more classes] *protection domain and class* based on data persistently stored in said computer system, wherein said data associates code identifiers with a set of one or more permissions.

* * * * *